//

US006861386B2

(12) United States Patent
Angeletakis et al.

(10) Patent No.: US 6,861,386 B2
(45) Date of Patent: Mar. 1, 2005

(54) ACCELERATOR FOR METATHESIS CATALYST

(75) Inventors: Christos Angeletakis, Orange, CA (US); Mingfei Chen, Santa Rosa, CA (US)

(73) Assignee: Kerr Corporation, Orange, CA (US)

(*) Notice: Subject to any disclaimer, the term of this patent is extended or adjusted under 35 U.S.C. 154(b) by 111 days.

(21) Appl. No.: 10/313,359

(22) Filed: Dec. 6, 2002

(65) Prior Publication Data

US 2003/0166461 A1 Sep. 4, 2003

Related U.S. Application Data

(60) Provisional application No. 60/338,439, filed on Dec. 6, 2001.

(51) Int. Cl.[7] ................................................ B01J 31/00
(52) U.S. Cl. ........................ 502/155; 502/159; 502/170; 502/171; 502/172
(58) Field of Search .............................. 502/155, 158, 502/159, 170, 171, 172

(56) References Cited

U.S. PATENT DOCUMENTS

| | | | | |
|---|---|---|---|---|
| 4,717,498 | A | 1/1988 | Maxon | 252/174.15 |
| 4,849,127 | A | 7/1989 | Maxon | 252/174.15 |
| 5,266,670 | A | 11/1993 | Nakos et al. | 528/32 |
| 5,728,785 | A | 3/1998 | Grubbs et al. | 526/142 |
| 5,831,108 | A | 11/1998 | Grubbs et al. | 556/21 |
| 6,075,068 | A | 6/2000 | Bissinger | 523/116 |
| 6,121,362 | A | 9/2000 | Wanek et al. | 524/448 |
| 6,252,101 | B1 | 6/2001 | Herzig et al. | 556/453 |
| 6,455,029 | B1 | 9/2002 | Angeletakis et al. | 424/49 |

FOREIGN PATENT DOCUMENTS

| | | | | |
|---|---|---|---|---|
| DE | 19859191 A1 | 12/1998 | | C08G/61/08 |
| EP | 0796607 | 9/1997 | | A61K/6/00 |
| EP | 0940405 A1 | 12/1998 | | C07F/7/18 |
| EP | 1 025 830 | 8/2000 | | A61K/6/087 |

OTHER PUBLICATIONS

International Organization for Standardization, *Dental Elastomeric Impression Materials*, ISO 4823 (1992).

Scholl et al., *Synthesis and Activity of a New Generation of Ruthenium–Based Olefin Metathesis Catalysts Coordinated with 1,3–Dimesityl–4,5–dihydroimidazol–2–ylidene Ligands*, Org. Lett., vol. 1, No. 6, 953–956 (1999).

Chevalier et al., *Ring–Opening Olefin Metathesis Polymerisation (ROMP) as a Potential Cross–Linking Mechanism for Siloxane Polymers*, J. of Inorganic and Organometallic Polymers, vol. 9, No. 3, 151–164 (1999).

L. LeCamp et al., *Polydimethyl siloxane photoreticulable par voie cationique–I*, Eur. Polym. J. vol. 33, No. 9, pp. 1453–1462.

Kim et al., *Surface–Initiated Ring–Opening Metathesis Polymerization on Si/SiO$_2$*, Macromolecules 2000, 33(8), 2793–2795.

*Primary Examiner*—Mark L. Bell
*Assistant Examiner*—J. Pasterczyk
(74) *Attorney, Agent, or Firm*—Wood, Herron & Evans, LLP

(57) ABSTRACT

A polymerizable composition including a resin system comprising oligomers or polymers functionalized with groups curable by ring opening metathesis polymerization, a metathesis catalyst, and a catalyst accelerator. In examples of the present invention, the composition includes a ruthenium carbene complex catalyst capable of initiating ring-opening metathesis polymerization of the composition and a silicone-based sulfosuccinate salt capable of accelerating the polymerization initiated by the catalyst. In another example, the invention includes a paste/paste system in which a base paste includes the polymerizable oligomer or polymer and the catalyst accelerator and in which a catalyst paste includes the catalyst dissolved in an inert solvent.

28 Claims, No Drawings

ACCELERATOR FOR METATHESIS CATALYST

Pursuant to 37 C.F.R. § 1.78(a)(4), this application claims the benefit of and priority to prior filed Provisional Application Ser. No. 60/338,439, filed Dec. 6, 2001, which is expressly incorporated herein by reference.

FIELD OF THE INVENTION

This invention relates to compositions that undergo a metathesis reaction initiated by a metathesis catalyst, and more particularly, to a compound for accelerating the metathesis reaction.

BACKGROUND OF THE INVENTION

Polymerizable compositions are used in a wide variety of applications. For chemical curing systems, the polymerizable compositions advantageously comprise a two-paste system where the pastes are mixed immediately before use. Mixing of the two pastes initiates a chemical reaction that results in a cured material. Addition-curable silicones, for example, exhibit fast curing speeds and low shrinkages, and typically use a platinum-containing hydrosilation catalyst. This type of catalyst necessitates the use of vinyl-functionalized silicon-containing oligomers, which are generally expensive. In addition, there may be undesirable hydrogen evolution from the decomposition of the hydrosiloxane cross-linkers that are present in these systems.

Another type of polymerization system has been recently developed, wherein curing is achieved by a ring-opening metathesis polymerization (ROMP) mechanism. Metathesis is generally understood to mean the metal catalyzed redistribution of carbon-carbon double bonds. The polymerizable composition comprises a resin system that includes functionalities or groups that are curable by ROMP together with a metathesis catalyst, such as a ruthenium carbene complex. Usually the most expensive component of a ROMP curable formulation is the metathesis catalyst. There exists a need for increasing the efficiency of the metathesis catalyst in order to reduce costs and improve control for the speed of the polymerization process. Because the ROMP system is relatively new, there still exists a need to develop polymerizable compositions that cure efficiently by this metathesis reaction.

In addition to ROMP, other metathesis reaction systems utilize metathesis catalysts, for example ring closing metathesis, acyclic diene metathesis polymerization, ring opening metathesis and cross metathesis. There is further a need for increasing the efficiency of the metathesis catalyst in these other metathesis reaction systems.

SUMMARY OF THE INVENTION

The present invention provides a composition that undergoes a metathesis reaction wherein an accelerator is included to accelerate the metathesis reaction. For example, the present invention provides a polymerizable composition curable by ROMP wherein the accelerator is included to accelerate the polymerization initiated by the metathesis catalyst. The composition comprises a polymerizable resin system having olefin functional groups that can undergo a metathesis reaction and a metathesis catalyst that initiates the ring-opening metathesis polymerization of the composition. The accelerator in the compositions of the present invention is a silicone-based anionic polymer, such as a silicone-based sulfosuccinate salt, for example a dimethicone copolyol sulfosuccinate compound, which accelerates the metathesis reaction initiated by the metathesis catalyst.

In an embodiment of the invention, the composition is a base/catalyst system in which the base paste includes a polymerizable resin and the accelerator and the catalyst paste includes the metathesis catalyst dissolved in an inert solvent. In one further example of the present invention, the polymerizable resin is an oligomer or polymer, such as polydimethylsiloxane, having at least one cyclic olefin group, such as norbornenyl groups, and the catalyst is a ruthenium carbene complex. In another example of the present invention, the accelerator is a dimethicone copolyol sulfosuccinate ammonium salt.

DETAILED DESCRIPTION OF THE INVENTION

The present invention provides a composition having an olefin-containing system, such as a cyclic olefin-containing resin system or an acyclic olefin-containing system, that undergoes a metathesis reaction with the aid of a metathesis catalyst and a catalyst accelerator. The composition may comprise a catalyst paste and base paste in intimate admixture with one another in a polymerizable paste/paste system. Generally, in this system, the catalyst paste comprises the metathesis catalyst for initiating polymerization, and a solvent for the catalyst that is miscible or dispersible with the base paste. The base paste generally comprises a polymerizable oligomer and/or polymer resin system that is curable via ROMP, and the metathesis reaction accelerator.

In the present invention, the catalyst accelerator may be incorporated into the olefin-containing system, such as in the base paste, to further accelerate the metathesis reaction rate, such as the ROMP rate, thereby enhancing the efficiency of the metathesis catalyst. Silicone-based anionic polymers can act as accelerators for the metathesis catalysts, such as the ruthenium complex catalysts. Dimethicone copolyol sulfosuccinate is one example of a silicone-based anionic polymer. Dimethicone copolyol sulfosuccinate is obtained in a two-step synthetic procedure, namely the reaction of dimethicone copolyol with maleic anhydride followed by reaction with a sulfite salt, such as ammonium salt or sodium salt. This two-step synthetic procedure is fully described in U.S. Pat. Nos. 4,717,498 and 4,849,127, which are incorporated by reference herein in their entirety. Dimethicone copolyol sulfosuccinate is described therein for use as a surfactant for shampoos and the like. However, these compounds have been found to unexpectedly function as catalyst accelerators when used in polymerizable compositions curable by ROMP, or in compositions that undergo other metathesis reactions.

The dimethicone copolyols used in the first step of the two-step synthetic procedure are obtained via the hydrosilation reaction of the corresponding methylhydrogen polysiloxane with a polyol having an alkenyl group on one end using a platinum catalyst. Examples of such dimethicone copolyols used in this procedure are Dow Corning 190 and 193. Alternatively, other silicone-based copolyols can be used where a phenylhydrogen polysiloxane is used in the hydrosilation reaction mentioned above. An exemplary commercially available accelerator is dimethicone copolyol sulfosuccinate ammonium salt, such as DC-30A available from McIntyre Chemical Co., Chicago Ill. Another example of an accelerator for use in the present invention is dimethicone copolyol sulfosuccinate sodium salt, such as DC-30 also available from McIntyre Chemical Co.

In addition to sulfosuccinate salts, salts of dimethicone copolyols functionalized with other acidic groups may also function as accelerators for the above-mentioned metathesis reactions. Examples of such groups include but are not limited to, carboxy, phosphate and phosphonate groups. These groups can be neutralized with Group I metals such as sodium or potassium or with Group II metals such as calcium and strontium. Alternatively, these groups can be neutralized with nitrogen compounds such as ammonia, alkyl amines or alcanolate amines.

By way of example and not limitation, one category of oligomers and/or polymers that may be used in polymerizable compositions of the present invention include telechelic (end-functionalized/end-capped) polymers with any of a variety of backbones, as long as the chain ends are functionalized with reactive olefin groups, such as cycloalkenyl groups. For example, the resin may be a telechelic polydimethyl-siloxane terminated with norbornenylethyl groups according the following structure:

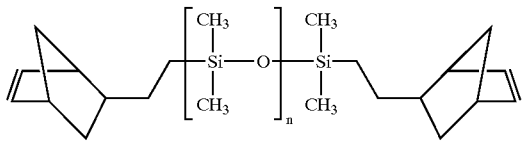

where n=5–5000, for example 27–1590. Other examples of telechelic polysiloxanes are those having the following structure:

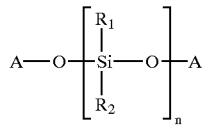

where n=5–5000, such as 27–1590;

$R_1, R_2 = C_1-C_{18}$ hydrocarbon or

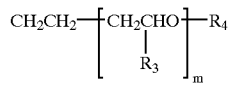

where $R_3, R_4 = C_1-C_{18}$ hydrocarbon, and m=0–2; and

A =

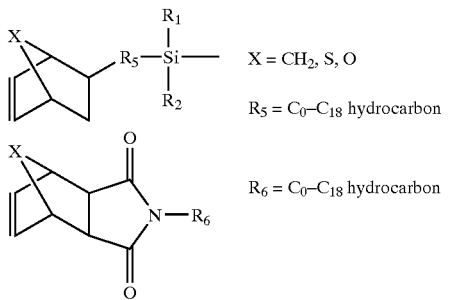

X = CH$_2$, S, O $R_5 = C_0-C_{18}$ hydrocarbon $R_6 = C_0-C_{18}$ hydrocarbon

For an alternative example, the resin may be polytetrahydrofuran-polyethylene oxide copolymer terminated with norbornenyl groups. As yet another alternative example, the resin may be a norbornenyl carboxylate terminated polybutadiene.

Another category of oligomers and/or polymers that may be used in polymerizable compositions of the present invention include oligomers or polymers tethered and end-capped with groups curable by a metathesis reaction, such as cycloalkenyl groups. The oligomers or polymers may have any of a variety of backbones, particularly silicon-containing backbones such as polydimethylsiloxane, with pendant groups incorporated within the backbone or main chain that protrude therefrom thus forming the tethered structure. As with the telechelic polymers, the chain ends are functionalized or capped with reactive olefin groups, such as cycloalkenyl groups, for example norbornenyl groups. The pendant groups may also be cycloalkenyl groups, such as norbornenyl groups. For example, the resin may be a polydimethylsiloxane tethered and end-capped with norbornenylethyl groups according the following structure:

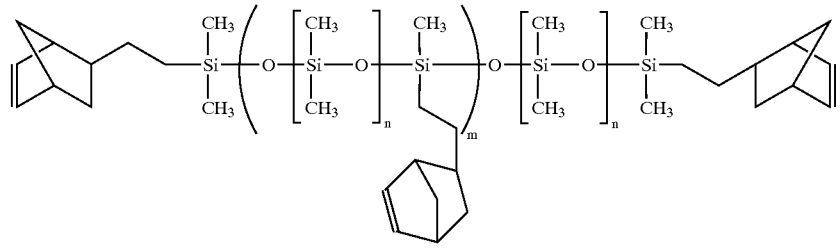

where n=5–5000, for example 27–1590, and m=1–100, for example 1–10.

Yet another category of oligomers and/or polymers that may be used in polymerizable compositions of the present invention include tri- or quadri-functional oligomers or polymers end-functionalized or end-capped with a group curable by a metathesis reaction, such as cycloalkenyl groups, for example norbornenyl groups. An example of such polymer is quadri-functional polydimethylsiloxane, end-capped with norbornenylethyl groups.

In addition to the above categories of oligomers and polymers, the polymerizable resin system may comprise any other cycloalkenyl-functionalized oligomers or polymers that may undergo polymerization via ROMP mechanism or any acyclic olefin-functionalized oligomer or polymer that may undergo acyclic diene metathesis polymerization. Other such examples include dicyclopentadiene or other cycloolefins. Alternatively, the composition may include a non-polymerizable olefin-containing system capable of undergoing ring closing metathesis, ring opening metathesis, or cross metathesis.

The catalysts useful in the present invention include any catalyst that initiates a metathesis reaction of the olefin-containing system. For example, the catalyst may be a metal-based catalyst such as molybdenum, tungsten and ruthenium carbenes. Exemplary catalysts includes the ruthenium carbene complexes. For example, the parent benzylidene ruthenium complex A, with the following structure, exhibits high air and water stability:

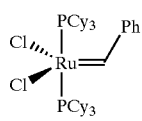

A

The ring-opening metathesis activity of the parent complex A can be increased by substituting a saturated imidazole ligand for a tricyclohexylphosphine ligand. The ligands may be 4,5-dihydroimidazol-2-ylidenes, which have the following general structure:

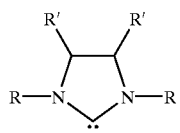

These substituted ligands have a basicity higher than that of tricyclohexylphosphine, as indicated by a higher pKa, which is believed to contribute to the higher activity. Ruthenium complex B, a derivative of complex A and having the structure shown below, is a substituted ruthenium carbene complex including such a ligand:

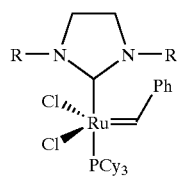

B

Other derivatives of parent complex A can also be used with the olefin-containing system in the composition, such as substituted ruthenium carbene complexes C and D having the following structures:

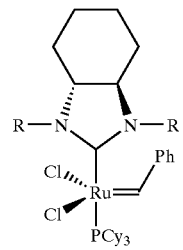

C

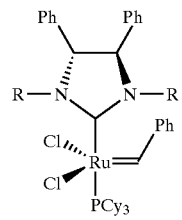

D

The catalyst component of the composition is formulated by dissolving the ruthenium carbene complex in an inert solvent. The solvent, or diluent, is chosen such that the solvent and the complex are miscible (soluble) or dispersible with the base paste, and such that the solvent does not interfere with the reaction. The solvent may be, for example, 3-phenyl-heptamethyl-trisiloxane. Another exemplary solvent is a partially phenyl-substituted poly (dimethylsiloxane), such as Dow Corning fluid 556. The composition may further include filler systems and/or optional additives suitable for the particular application, such as pigments, that do not interfere with the reaction.

EXAMPLE 1

A telechelic poly(dimethylsiloxane) end-capped with norbornenyl groups (Compound 1) was synthesized according to the following scheme using KOH as the acid scavenger:

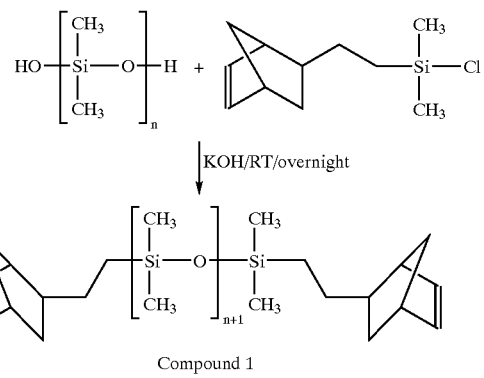

Compound 1

A 500 mL reaction kettle equipped with a mechanical stirrer was charged with 260 g silanol terminated poly (dimethylsiloxane) (PDMS) of 26,000 molecular weight (10 mmol, DMS-S31, n=350 (average), from Gelest Corp.), 1.2 g KOH (22 mmol) and 4.3 g 2-(5-norbornenyl) ethyldimethylchlorosilane (21 mmol). The mixture was stirred overnight at room temperature (RT). That reaction mixture was diluted with 2 L hexanes and stirred with about 100 g of diatomaceous earth (Celite®, from Spectrum Chemicals). The solution was filtered and solvent was removed on a rotary evaporator to afford Compound 1 as a clear liquid product having n=3350 (average) and a viscosity of 4.9 Pa.s. GPC (toluene) Mn 32,000 and Mw 67,000.

A poly(dimethylsiloxane) (PDMS) tethered and end-capped with norbornenyl groups (Compound 2) was synthesized according to the following scheme using KOH as acid scavenger:

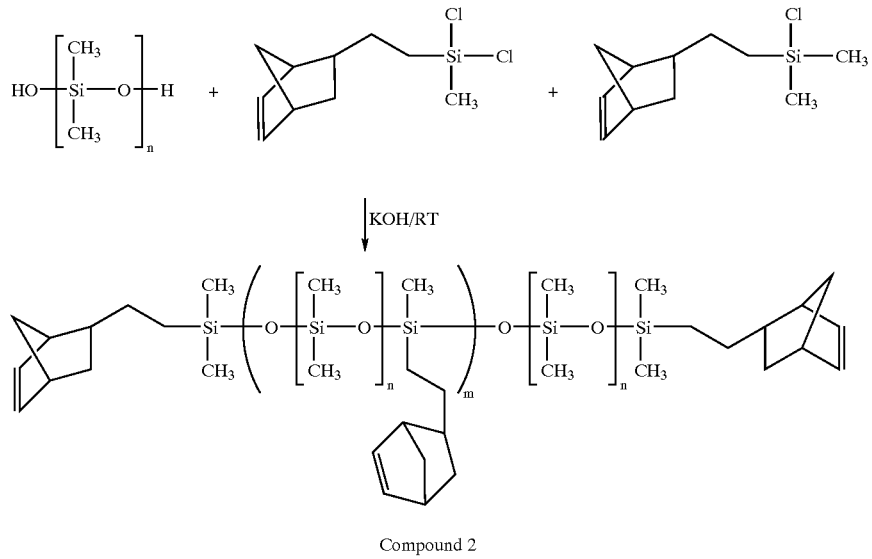

Compound 2

A 500 mL reaction kettle equipped with a mechanical stirrer was charged with 260 g silanol terminated poly (dimethylsiloxane) of 26,000 molecular weight (DMS-S31, n=350 (average), 10 mmol, from Gelest Corp.), 1.23 g KOH (22 mmol), 2.02 g 2-(5-norbornenyl) ethylmethyldichlorosilane (8.56 mmol) and 0.617 g 2-(5-norbornenyl)ethyldimethylchlorosilane (2.87 mmol). The mixture was stirred overnight at RT. The viscous resin was diluted with hexanes and stirred with about 100 g diatomaceous earth (Celite®, from Spectrum Chemicals). The solution was then filtered and solvent was removed on a rotary evaporator to afford Compound 2 with a viscosity of 61.6 Pa.s. GPC (toluene) Mn 74,000 and Mw 67,000.

A quadri-functional poly(dimethylsiloxane), referred to as a Q-resin, end-capped with norbornenyl groups (Compound 3) was synthesized according to the following scheme. A 500 mL round bottom flask equipped with a Dean-Stark trap and a magnetic spin bar was charged with 300 mL toluene, which was azeotropically refluxed for two hours to remove water. Next, 90 g silanol terminated Q-resin (SQO-299, Mw 3000–4000, OH 1.7–2.0% from Gelest Corp.) was dissolved in the dried toluene. After cooling down, 12.9 g triethylamine (0.13 mol) containing 1% 4-(N,N-dimethyl) aminopyridine (0.13 g, 1.1 mmol) was charged. Then 22.4 g 2-(5-norbornenyl)ethyldimethylchlorosilane (0.104 mol) was added dropwise. The reaction was stirred overnight at RT. The white precipitate was filtered off. The toluene solution was washed three times with 5% HCl (300 mL) and three times with deionized water (300 mL) and dried over $Na_2SO_4$. Evaporation of the solvent on a rotary evaporator afforded a solid product, Compound 3. The yield was 80%. The results of NMR (Nuclear Magnetic Resonance) analysis is as follows: NMR(1H) 0.15 δ ($CH_3$—Si), 5.9, 6.1 δ (vinyl H).

Five polymerizable compositions including these resins were formulated for testing. The base paste composition is shown below in Table 1:

TABLE 1

Test Base Paste Composition (Wt.)

| | |
|---|---|
| Base Resin Components | 59.2 |
| Calcium Silicate Wollastonite (2–10 μm average particle size) | 36.8 |
| Sub-micron Silica (2–10 μm average particle size) | 4 |
| Total | 100 |

The base resin components used in the base paste compositions are shown below in Table 2, wherein Test 1 does not include a catalyst accelerator, and Tests 2–5 include an accelerator in accordance with the present invention.

TABLE 2

| Base Resin Component | Test 1 | Test 2 | Test 3 | Test 4 | Test 5 |
|---|---|---|---|---|---|
| End-capped PDMS, 1 | 30 | 29.8 | 29.8 | 29.8 | 29.9 |
| Tethered PDMS, 2 | 70 | 70.12 | 69.45 | 59.55 | 69.7 |
| NB functionalized Q-resin, 3 | 0 | 0 | 0 | 9.9 | 0 |
| Accelerator (DC-30A)[1] | 0 | 0.08 | 0.25 | 0.25 | 0.15 |
| Surfactant (Igepal ® CO-520)[2] | 0 | 0 | 0.50 | 0.50 | 0.25 |

[1] A dimethicone copolyol sulfosuccinate ammonium salt available from McIntyre Chemical Co., Chicago IL.
[2] An ethoxylated alkylphenol available from Rhone-Poulenc, Cranberry NJ.

The catalyst used is 1,3-dimesityl-4,5-dihydroimidazol-2-ylidene-substituted ruthenium carbene complex (B) with the structure indicated above, obtained from Materia Inc., Pasadena, Calif. The catalyst paste was then formulated by dissolving the ruthenium carbene complex B in a partially phenyl substituted poly(dimethylsiloxane), in particular, Dow Corning fluid 556. The solutions were then compounded with calcium silicate Wollastonite and silica and were mixed for 60 seconds in a centrifugal type mixer, (Speed Mix type AM501T, Hauschild Engineering, Hamm, Germany). These suspensions are referred to as the catalyst components, or catalyst pastes, and are further described in Table 3.

TABLE 3

Test Catalyst Paste Composition (Wt. %)

| | |
|---|---|
| Dow Corning Fluid 556 | 39.05 |
| Calcium Silicate Wollastonite (2–10 μm average particle size) | 53.30 |
| Sub-micron Silica (2–10 μm average particle size) | 7.40 |
| Catalyst B | 0.25 |
| Total | 100 |

The curing parameters and some physical properties are given below in Table 4. The test materials 1–5 comprise the catalyst paste of Table 3 and the base paste of Table 1 including the resin components 1–5, respectively, as listed in Table 2. All ROMP cured test materials were mixed in a 10:1 ratio of base paste to catalyst paste. The physical properties of the cured compositions are determined, using ISO Specification No. 4823 for evaluation of work time and set time; and ASTM Standards for the evaluation of tensile strength and elongation (ASTM D412, Die D). The water contact angle is measured at 60 seconds after a drop of distilled water is applied to a cured composition of the invention, at room temperature using a contact angle goniometer (model 100 made by Rame-Hart, Inc., Mountain Lakes, N.J.).

TABLE 4

Physical Properties of ROMP Materials

| Reference | Test 1 | Test 2 | Test 3 | Test 4 | Test 5 |
|---|---|---|---|---|---|
| Catalyst Loading (%) | 0.40 | 0.25 | 0.25 | 0.25 | 0.25 |
| Resin Viscosity, η* at 25° C. (Pa · s) | 11.63 (0.07) | 10.68 (0.10) | 10.79 (0.11) | 8.88 (0.10) | 11.0 (0.1) |
| Work Time (sec.) | 147 | 118 | 112 | 140 | 74 |
| Set Time (sec.) | 304 | 272 | 217 | 304 | 187 |
| First Viscosity, η* at 25° C. (Pa · s) on Rheometer (~20 sec.) | 49 | 53 | 80 | 57 | 77 |
| Tensile Strength (MPa) (Die D³) | 2.20 (0.31) | 2.23 (0.13) | 1.12 (0.16) | 1.60 (0.11) | 1.44 (0.19) |
| Elongation (%) (Die D) | 224 (27) | 320 (14) | 438 (68) | 299 (36) | 423 (106) |
| Contact Angle (deg.) | 101 (1) | | 39 (7) | 51 (2) | 58 (1) |

The results show that the addition of the dimethicone copolyol sulfosuccinate acted as an accelerator for the ruthenium complex catalyst. Significantly shorter work times and set times were observed in Tests 2, 3 and 5, which contain the accelerator, as compared to Test 1, which does not include the accelerator. As a result, a lesser amount of the catalyst may be used in the composition, thereby economizing its use. For example, a polymerizable composition of the present invention may comprise about 0.4–0.5 wt. % catalyst in the absence of the dimethicone copolyol sulfosuccinate, or may comprise about 0.25 wt. % catalyst and about 0.05–0.5 wt. % dimethicone copolyol sulfosuccinate, both compositions having relatively similar physical properties. In test 4, the addition of the NB functionalized Q-resin to the base resin composition did not result in a substantial work time reduction in the presence of the accelerator, but still enabled a lesser quantity of catalyst as compared to test 1. An increase in tensile strength, however, was observed in test 4 due apparently to the expected higher crosslinking tendency of the Q-resin.

Additional testing of these types of compounds (as accelerators) from McIntyre Chemical Company was performed, specifically, Mackanate DC-30 (Disodium PEG-12 Dimethicone Sulfosuccinate) and Mackanate DC-30A (Diammonium PEG-12 Dimethicone Sulfosuccinate). The first is a marketed product and the second is a developmental product at the present time.

The two dimethicone copolyol sulfosuccinate materials mentioned above were dried to remove water present (approx. 17%) by placing in an oven overnight at 50° C. with 1 mm Hg vacuum. Various amounts of DC-30A were incorporated in formulations very similar to that used in Test 3. The results indicating the variation of working and setting time with increased concentration of DC-30A are shown in Table 5. From these results it appears about 0.25 wt. % is a suitable level.

TABLE 5

Working Time Variation with Accelerator Content

| Reference | Test 6 | Test 7 | Test 8 | Test 9 |
|---|---|---|---|---|
| DC-30A dried wt. % | 0 | 0.1 | 0.25 | 0.4 |
| Working Time WT (sec.) | 320 | 147 | 97 | 93 |
| Set Time ST (sec.) | undefined | 496 | 330 | 308 |
| Time to 400 Pa · s (WT) (sec.) | 365 | 134 | 100 | 96 |
| Time to 5000 Pa · s (ST) (sec.) | undefined | 427 | 274 | 259 |

A physical property comparison was done between the two materials. The results are shown in Table 6. Based on the results, DC-30A is a more efficient accelerator, suggesting that ammonium ion plays a key role in the reaction rate change effect.

TABLE 6

Comparison of Efficiency of Accelerators DC-30 and DC-30A

| Reference | Test 1 | Test 10 | Test 11 |
|---|---|---|---|
| Accelerator | None | 0.08% DC-30 dried | 0.08% DC-30A dried |
| Catalyst Loading (%) | 0.40 | 0.25 | 0.25 |
| Resin Viscosity, η* at 25° C (Pa · s) | 11.63 (0.07) | 11.14 (0.04) | 11.28 (0.11) |
| Working Time WT (sec.) | 147 | 202 | 80 |
| Set Time ST (sec.) | 304 | 660 | 222 |
| Tensile Strength MPa (Die D) | 2.20 (0.31) | 2.18 (0.16) | 1.98 (0.07) |
| Elongation (%) (Die D) | 224 (27) | 252 (12) | 269 (18) |

It should be understood that the catalyst accelerator is believed to be effective with other metathesis catalysts based on other transition metals such as molybdenum and tungsten, not just the exemplary ruthenium carbene complexes described herein.

It should also be understood that, although the ROMP mechanism has been described in detail, the catalyst accelerator is believed to be effective with other metathesis reactions other than ROMP, such as ring closing metathesis, acyclic diene metathesis polymerization, ring opening metathesis and cross metathesis. In each of these metathesis reactions, a metathesis catalyst is used, and the accelerator in accordance with the present invention is effective to accelerate that catalyst.

While not intending to be bound by theory, the mechanism of the exemplary ruthenium carbene complex catalysts has been described recently as a two-step process involving the reversible dissociation of the phosphine ligand from the metal center of the catalyst, followed by the binding of the olefin group to the metal center. (Sanford et al., "New Insights into the Mechanism of Ruthenium Catalyzed Olefin Metathesis Reactions," 123 J. Am. Chem. Soc. 749 (2001)). By reversible dissociation is meant that the free phosphine ligand may re-coordinate to the metal, thereby competing with the binding of the olefin group to the metal center. The anionic polymer accelerator of the present invention is believed to function as a trap for the dissociated ligand, such as tricyclohexylphosphine, thereby preventing or interfering with its re-coordination to the metal center, and thereby enabling binding of the olefin group to the metal center. Thus, by eliminating or reducing the competition between the free phosphine and the olefin groups, the activity of the catalyst can be accelerated. This theory is applicable regardless of which transition metal forms the metal center, and regardless which particular type of metathesis reaction is occurring. For example, ROMP and ring opening metathesis start with cyclic olefin groups, whereas acyclic diene metathesis polymerization, ring closing metathesis and cross metathesis start with acyclic olefin groups. The accelerated reaction involves facilitating binding of the olefin groups, whether cyclic or acyclic, to the metal center of the catalyst by trapping the free ligand.

In the exemplary embodiment in which the silicone-based anionic polymer is a dimethicone copolyol sulfosuccinate salt, the associated cation of the salt is believed to play an important role in trapping the dissociated ligand. In tests 10 and 11, the salt having the ammonium ion appeared to have a greater effect on the acceleration rate than the salt having the sodium ion. Therefore, in the possible mechanism described above, the silicone-based anionic polymer together with its associated cation acts to trap the dissociated ligand, and the effectiveness of that trapping function may vary depending on the nature of the associated cation.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative methods and illustrative examples shown and described. Accordingly, departures may be made from such details without departing from the scope or spirit of applicant's general inventive concept.

What is claimed is:

1. A composition comprising:
   an olefin-containing resin capable of undergoing a metathesis reaction;
   a metathesis catalyst, wherein the catalyst is capable of initiating the metathesis reaction of the resin; and
   a catalyst accelerator capable of accelerating the metathesis reaction initiated by the catalyst, wherein the catalyst accelerator is a salt of an anionic dimethicone copolyol.

2. The composition of claim 1 wherein the olefin-containing resin comprises cyclic olefin groups capable of undergoing a metathesis reaction selected from the group consisting of ring opening metathesis polymerization and ring opening metathesis.

3. The composition of claim 1 wherein the olefin-containing resin comprises acyclic olefin groups capable of undergoing a metathesis reaction selected from the group consisting of acyclic diene metathesis polymerization, cross metathesis and ring closing metathesis.

4. The composition of claim 1 wherein the catalyst accelerator is a sulfosuccinate salt of the anionic dimethicone copolyol.

5. The composition of claim 1 wherein the catalyst is a ruthenium carbene complex.

6. A polymerizable composition comprising:
   a resin comprising at least one oligomer or polymer functionalized with at least one group polymerizable by ring-opening metathesis polymerization;
   a metathesis catalyst, wherein the catalyst is capable of initiating the ring-opening metathesis polymerization of the resin to form a polymerized material; and
   a catalyst accelerator capable of accelerating the polymerization initiated by the catalyst, wherein the catalyst accelerator is a salt of an anionic dimethicone copolyol.

7. The composition of claim 6 wherein the catalyst accelerator is a sulfosuccinate salt of the anionic dimethicone copolyol.

8. The composition of claim 7 wherein the catalyst accelerator is dimethicone copolyol sulfosuccinate ammonium salt.

9. The composition of claim 7 wherein the catalyst accelerator is dimethicone copolyol sulfosuccinate sodium salt.

10. The composition of claim 6 wherein the catalyst is a ruthenium carbene complex.

11. The composition of claim 6 wherein the catalyst is a benzylidene ruthenium complex of the formula:

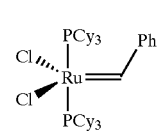

A wherein Cy is cyclohexyl and Ph is phenyl.

12. The composition of claim 6 wherein the catalyst is a 4,5-dihydroimidazol-2-ylidene-substituted ruthenium carbene complex.

13. The composition of claim 6 wherein the catalyst is of the formula:

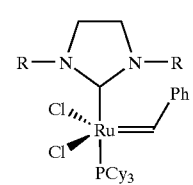

B wherein Cy is cyclohexyl, Ph is phenyl and R is mesityl.

14. The composition of claim 6 wherein the catalyst is of the formula:

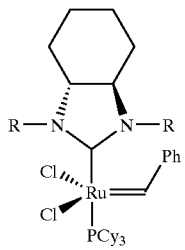

wherein Cy is cyclohexyl, Ph is phenyl and R is mesityl.

15. The composition of claim 6 wherein the catalyst is of the formula:

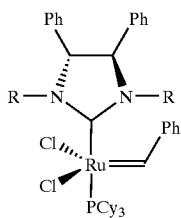

wherein Cy is cyclohexyl, Ph is phenyl and R is mesityl.

16. The composition of claim 6 wherein the group is a cycloalkenyl group.

17. The composition of claim 6 wherein the group is a norbornenyl group.

18. A polymerizable composition comprising:
- a base paste comprising a resin comprising at least one oligomer or polymer functionalized with at least one group polymerizable by ring-opening metathesis polymerization, and a catalyst accelerator; and
- a catalyst paste comprising a ruthenium carbene complex catalyst dissolved in a solvent which is miscible with the base paste,
- wherein the catalyst is capable of initiating the ring-opening metathesis polymerization of the composition to form a polymerized material, and
- wherein the catalyst accelerator is a salt of an anionic dimethicone copolyol and is capable of accelerating the polymerization initiated by the catalyst.

19. The composition of claim 18 wherein the catalyst accelerator is a sulfosuccinate salt of the anionic dimethicone copolyol.

20. The composition of claim 19 wherein the catalyst accelerator is dimethicone copolyol sulfosuccinate ammonium salt.

21. The composition of claim 19 wherein the catalyst accelerator is dimethicone copolyol sulfosuccinate sodium salt.

22. The composition of claim 18 wherein the catalyst is a benzylidene ruthenium complex of the formula:

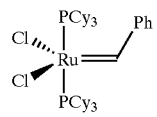

wherein Cy is cyclohexyl and Ph is phenyl.

23. The composition of claim 18 wherein the catalyst is a 4,5-dihydroimidazol-2-ylidene-substituted ruthenium carbene complex.

24. The composition of claim 18 wherein the complex is of the formula:

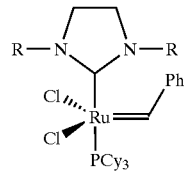

wherein Cy is cyclohexyl, Ph is phenyl and R is mesityl.

25. The composition of claim 18 wherein the complex is of the formula:

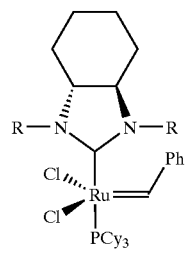

wherein Cy is cyclohexyl, Ph is phenyl and R is mesityl.

26. The composition of claim 18 wherein the complex is of the formula:

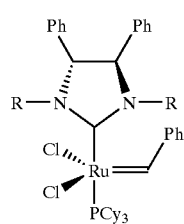

wherein Cy is cyclohexyl, Ph is phenyl and R is mesityl.

27. The composition of claim 18 wherein the group is a cycloalkenyl group.

28. The composition of claim 18 wherein the group is a norbornenyl group.

* * * * *

UNITED STATES PATENT AND TRADEMARK OFFICE
CERTIFICATE OF CORRECTION

PATENT NO. : 6,861,386 B2
DATED : March 1, 2005
INVENTOR(S) : Christos Angeletakis et al.

It is certified that error appears in the above-identified patent and that said Letters Patent is hereby corrected as shown below:

Column 5,
Line 26, "catalysts includes" should read -- catalysts include --.

Column 6,
Line 30, "Dow Coming" should read -- Dow Corning --.
Line 66, "n=3350" should read -- n=350 --.

Column 7,
Line 62, "is as follows" should read -- are as follows --.

Signed and Sealed this

Ninth Day of August, 2005

JON W. DUDAS
*Director of the United States Patent and Trademark Office*